(12) United States Patent
Thomson et al.

(10) Patent No.: US 6,298,715 B1
(45) Date of Patent: Oct. 9, 2001

(54) SCANNING FORCE MICROSCOPE PROBE CANTILEVER WITH REFLECTIVE STRUCTURE

(75) Inventors: Douglas J. Thomson, Winnipeg (CA); Christopher O. Lada, Palo Alto, CA (US)

(73) Assignee: MFI Technologies Corporation, San Jose, CA (US)

( * ) Notice: Subject to any disclaimer, the term of this patent is extended or adjusted under 35 U.S.C. 154(b) by 0 days.

(21) Appl. No.: 09/471,467

(22) Filed: Dec. 22, 1999

(51) Int. Cl.⁷ .................................. G01B 5/28; G01B 7/34
(52) U.S. Cl. .......................... 73/105; 250/306; 250/307
(58) Field of Search .............................. 73/105; 250/306, 250/307

(56) References Cited

U.S. PATENT DOCUMENTS 5,394,741 * 3/1995 Kajimura et al. ..................... 73/105
5,908,981 * 6/1999 Atalar et al. ........................... 73/105

OTHER PUBLICATIONS

Albrecht et al., "Microfabrication of Cantilever Styli for the Atomic Force Microscope", J. Vac. Sci. Techol. A, vol. 8, No. 4, Jul./Aug. 1990, pp. 3386–3395.*

Manalis et al., "Interdigital Cantilever for Atomic Force Microscopy", Appl. Phys. Lett., vol. 69, No. 25, Dec. 16, 1996, pp. 3944–3946.*

Yaralioglu et al., "Analysis and Design of an Interdigital Cantilever as a Displacement Sensor", Journal of Applied Physics, vol. 83, No. 12, Jun. 15, 1998, pp. 7405–7415.*

* cited by examiner

Primary Examiner—Daniel S. Larkin
(74) Attorney, Agent, or Firm—Blakely, Sokoloff, Taylor & Zafman, LLP

(57) ABSTRACT

A scanning force microscope probe cantilever having a reflective structure. In one embodiment, the described scanning force microscope probe cantilever includes a reflective structure on the cantilever. In one embodiment, light is directed to the reflective structure on the cantilever in a direction having a directional component from a fixed end to a free end of the cantilever. In one embodiment, light is reflected from the reflective structure in a direction having a directional component from the free end to a fixed end of the cantilever.

23 Claims, 8 Drawing Sheets

SCANNING FORCE MICROSCOPE PROBE CANTILEVER WITH REFLECTIVE STRUCTURE

BACKGROUND OF THE INVENTION

1. Field of the Invention

The present invention relates generally to a scanning probe microscopy apparatus and, more specifically, the present invention relates to a integrated circuit testing apparatus.

2. Background Information

One use for scanning force microscopes is to measure periodic electrical signal waveforms on or near a surface of a sample such as for example an integrated circuit. FIG. 1 is a block diagram illustrating a present day scanning force microscope 101. As shown in FIG. 1, the scanning force microscope 101 includes a probe 113 having a cantilever 115 positioned on or near a signal line 117 proximate to a surface 118 of a sample 119. An optical source 103 provides light 123 which is directed through a beam splitter 107, directed through a lens 109 and is reflected off a mirror 111 onto cantilever 115.

Cantilever 115 is coupled to receive a probe waveform that is used to measure the periodic electrical signal waveforms in signal line 117. The interaction between the periodic electrical signal waveforms in signal line 117 and the probe waveform in cantilever 115 causes periodic mechanical motion of cantilever 115 through the capacitive coupling between cantilever 115 and signal line 117. This mechanical motion is detected with detector 105 through light beam 123, which is reflected off cantilever 115 back off of mirror 111 through lens 109 and off of beam splitter 107 into detector 105. Alternatively, the cantilever 115 can directly contact the signal line 117 and directly couple the electrical signal from the signal line 117 to the cantilever 115 and eventually to the probe 113. From the probe 113, the signal can be coupled to any number of apparatuses, such as for example oscilloscopes, to measure the characteristics of the signal.

FIG. 2 is an illustration showing probe 113 and cantilever 115 of FIG. 1 in greater detail. As shown in FIG. 2, a fixed end of cantilever 115 is attached to a chip 201. Light 123 is directed to a back side of cantilever 115 and is reflected off of the back side. Motion of cantilever 115 is detected by observing light beam 123 after it has been reflected off the back side of cantilever 115.

Referring back to FIG. 1, it can be seen that a microscope objective lens 121 is used to observe and position cantilever 115 in relation to the surface 118 of sample 119. One disadvantage with present day scanning force microscope 101 is that mirror 111 partially obstructs the field of vision of microscope objective lens 121 when viewing and positioning cantilever 115.

Another disadvantage with the present day scanning force microscope 101 is that it is difficult to measure simultaneously two or more nodes in close proximity on the surface 118 of sample 117. In particular, since mirror 111 is positioned above cantilever 115 and protrudes beyond the free end of cantilever 115 as shown in FIG. 1, it is difficult to position more than one scanning force microscope to measure multiple signal waveforms in a small area of surface 118. More generally, in present day scanning probe microscopes employing optical deflection sensors, it is difficult to position two or more probes in close proximity due to the protrusion of the optical path used to sense cantilever motion beyond the end of the cantilever.

SUMMARY OF THE INVENTION

A scanning force microscope probe is disclosed. In one embodiment, the scanning force microscope probe includes a cantilever having a first end and a second end. A reflective structure is included on the cantilever such that at least a portion of light that is directed from a direction toward the first end is reflected from the reflective structure in a direction toward the second end. Additional features and benefits of the present invention will become apparent from the detailed description, figures, and claims set forth below.

BRIEF DESCRIPTION OF THE DRAWINGS

The present invention is illustrated by way of example and not limitation in the accompanying figures.

DETAILED DESCRIPTION

A scanning force microscope probe is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

One embodiment of the present invention is a scanning force microscope probe cantilever having a reflective structure on the cantilever. In one embodiment of the present invention, light is directed through free space to the cantilever in a direction including a directional component from the fixed end to the free end of the cantilever. With the reflective structure on the cantilever, the light is reflected through free space in one embodiment back in a direction including a directional component from the free end to the fixed end of the cantilever. As a result, the optics used to direct the light through free space to and from the cantilever may be moved back away from being directly over the tip of the cantilever. Thus, the optics, such as for example a mirror, is pulled away from the field of vision of the microscope objective lens used to observe the scanning force microscope probe cantilever. Furthermore, with the optics pulled back as described above, a plurality of locations in close proximity may be probed in accordance with the teachings of one embodiment of the present invention.

Figure 3:
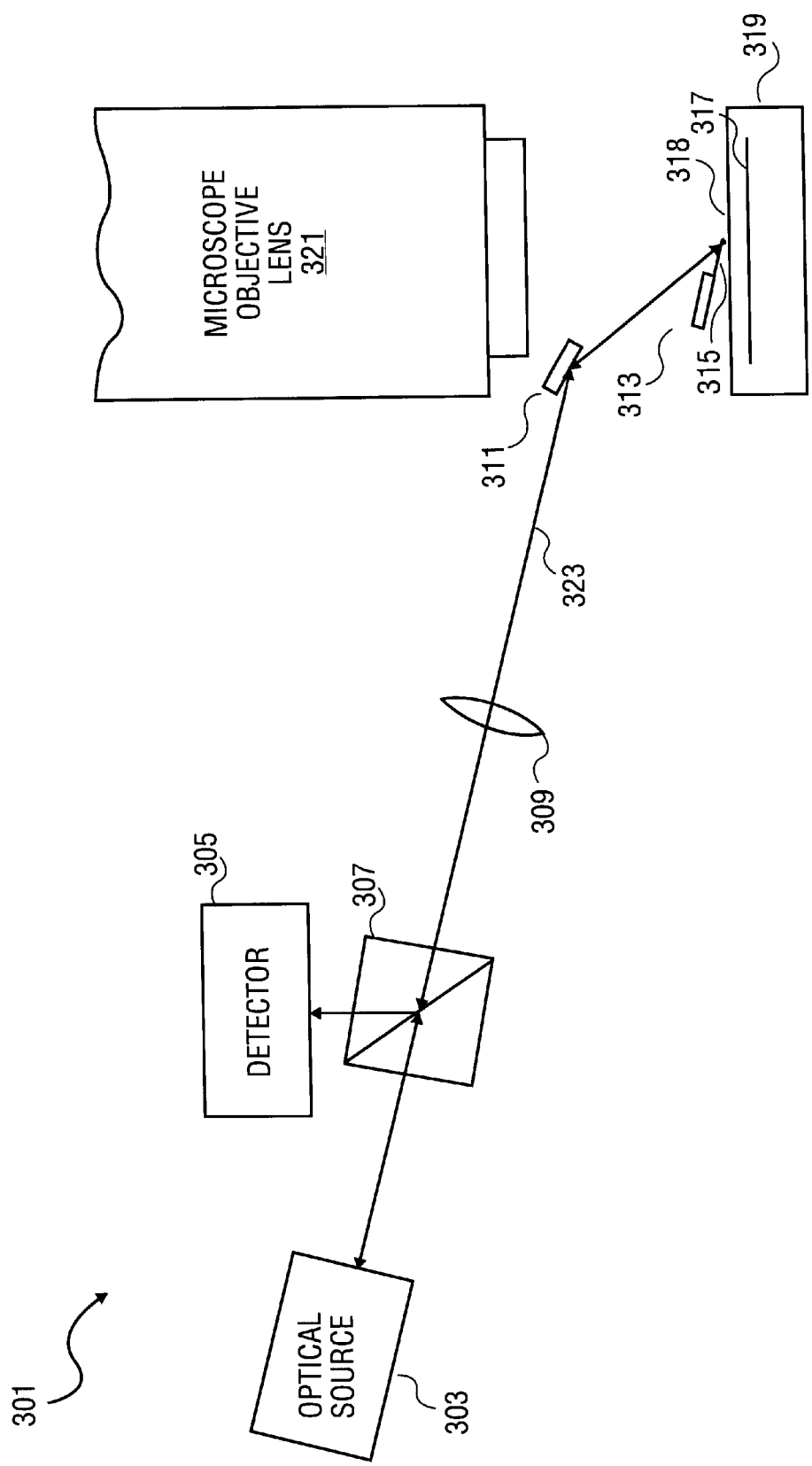
FIG. 3 is a block diagram illustrating one embodiment of a scanning force microscope having a cantilever that reflects light in accordance with teachings of the present invention.

FIG. 3 is a block diagram of one embodiment of a scanning force microscope 301 in accordance with the teachings of present invention. A probe 313 having a cantilever 315 is positioned near a signal line 317 proximate to a surface 318 of a sample 319 to measure a periodic electrical waveform carried in signal line 317. In one embodiment, sample 319 is an integrated circuit die and signal line 317 is a circuit trace or node disposed on or beneath surface 318. In one embodiment, cantilever 315 is disposed near and spaced apart from surface 318. In another embodiment, cantilever 315 is in contact with surface 318. In one embodiment, cantilever 315 is coupled to receive a probe waveform that is used to measure the periodic electrical signal waveforms in signal line 317. The interaction between the periodic electrical signal waveforms in signal line 317 and the probe waveform in cantilever 315 causes periodic mechanical motion of cantilever 315 through the capacitive coupling between cantilever 315 and signal line 317. Alternatively, the cantilever 315 can directly contact the signal line 317 and directly couple the electrical signal from the signal line 317 to the cantilever 315 and eventually to the probe 313. From the probe 313, the signal can be coupled to any number of apparatuses, such as for example an oscilloscope, to measure the characteristics of the signal.

In one embodiment, an optical source 303 generates a light 323, which is directed through beam splitter 307, lens 309 and then is deflected off mirror 311. As shown in the embodiment of FIG. 3, light 323 is directed through free space to cantilever 315 of probe 313. In one embodiment, light 323 is directed from optical source 303 in a direction having a directional component from the fixed end to the free end of the cantilever 315. In one embodiment, optical source 303 is independent of cantilever 315 and incident light 323 to cantilever 315 is therefore independent of mechanical motion of cantilever 315. However, the mechanical motion of cantilever 315 is detected with detector 305 through reflected light 323, which in one embodiment is reflected through free space from cantilever 315. In one embodiment, light 323 is reflected off cantilever 315 in a direction having a directional component from the free end to the fixed end of cantilever 315. In one embodiment, light 323 is reflected back to minor 311 through lens 309 and off beam splitter 307 into detector 305.

Figure 1:
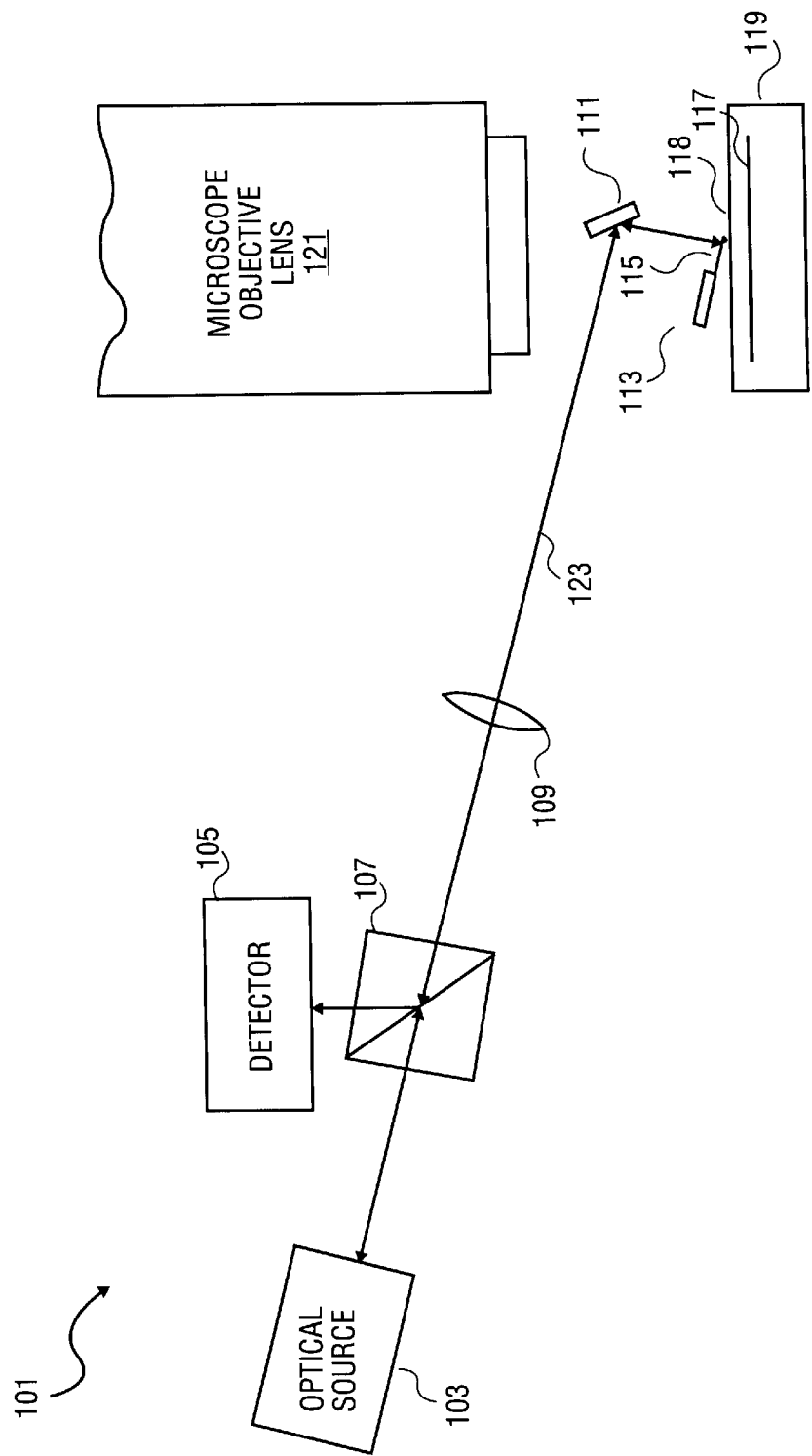
FIG. 1 is a block diagram of a scanning force microscope having a mirror that obstructs the field of vision of a microscope objective lens.
Figure 2:
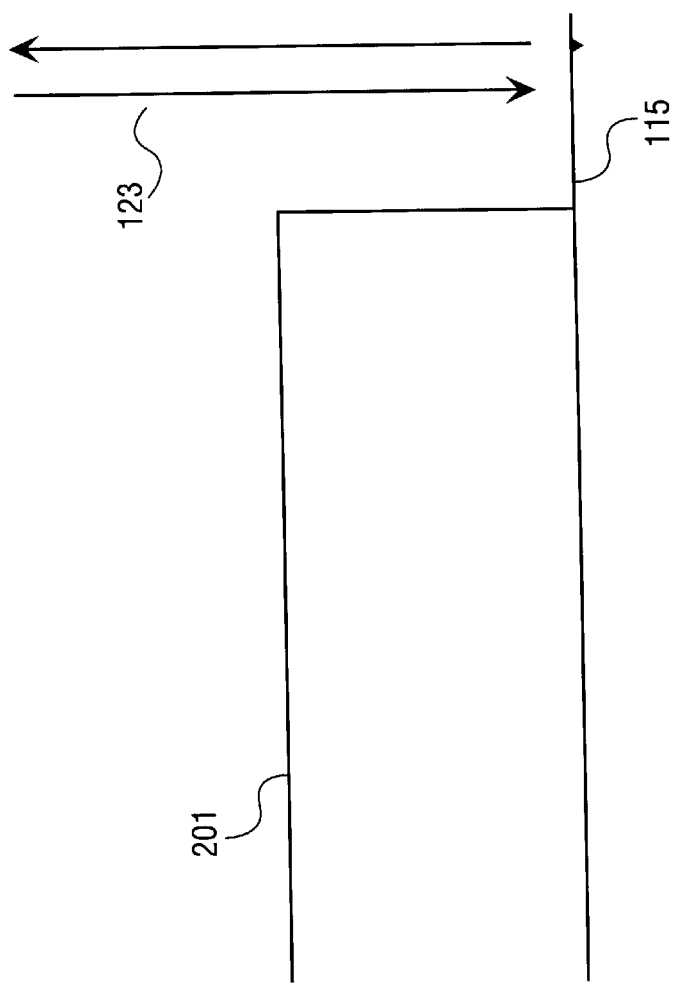
FIG. 2 is a block diagram of a scanning force microscope probe showing a cantilever with light being reflected off of the back side.

As shown in FIG. 3, mirror 311 is pulled back and away from being directly over cantilever 315 when compared to mirror 111 of the FIG. 1. As a result, it is appreciated that mirror 311 no longer obstructs microscope objective lens 321 when observing cantilever 315 or portions of sample 319 near the cantilever 315. As will be described in greater detail below, a plurality of signal lines 317 in close proximity can be probed using a plurality of scanning force microscopes 301 in accordance with the teachings of one embodiment of the present invention.

Figure 4:
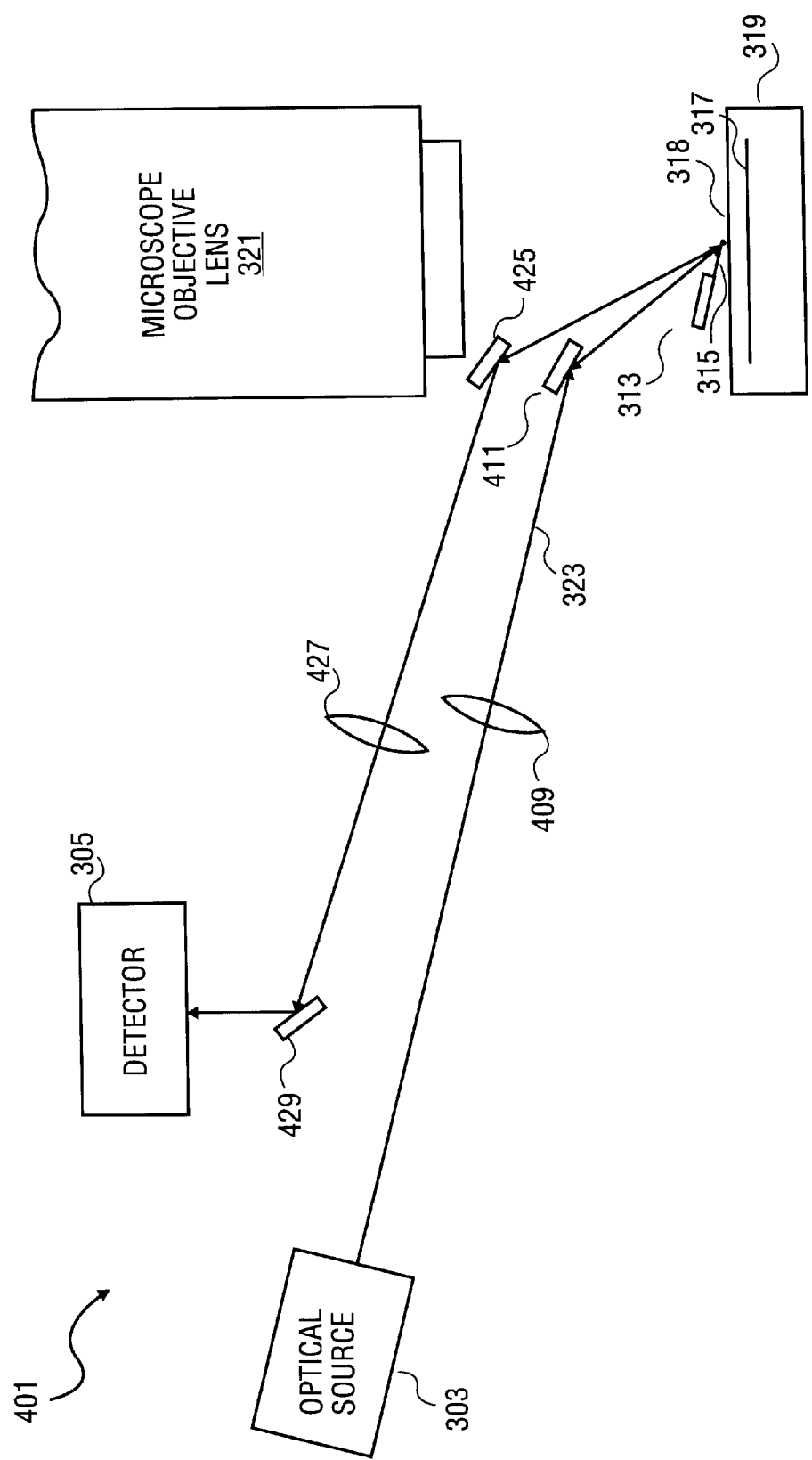
FIG. 4 is a block diagram of another embodiment of a scanning force microscope having a cantilever that reflects light in accordance with the teachings of the present invention.

FIG. 4 is a block diagram of another embodiment of a scanning force microscope 401 in accordance with the teachings of present invention. Probe 313 having cantilever 315 is positioned near signal line 317 proximate to surface 318 of sample 319 to measure a periodic electrical waveform carried in signal line 317. In one embodiment, cantilever 315 is disposed near and spaced apart from surface 318. In another embodiment, cantilever 315 is in contact with surface 318. In one embodiment, cantilever 315 is coupled to receive a probe waveform that is used to measure the periodic electrical signal waveforms in signal line 317. The interaction between the periodic electrical signal waveforms in signal line 317 and the probe waveform in cantilever 315 causes periodic mechanical motion of cantilever 315 through the capacitive coupling between cantilever 315 and signal line 317. In another embodiment, the cantilever 315 can directly contact the signal line 317 and directly couple the electrical signal from the signal line 317 to the cantilever 315 and eventually to the probe 313. From the probe 313, the signal can be coupled to any number of apparatus, such as for example an oscilloscope, to measure the characteristics of the signal.

In one embodiment, an optical source 303 generates a light 323, which is directed through lens 409 and then is deflected off mirror 411. As shown in the embodiment of FIG. 4, light 323 is directed through free space to cantilever 315 of probe 313. In one embodiment, light 323 is directed from optical source 303 in a direction having a directional component from the fixed end to the free end of cantilever 315. The mechanical motion of cantilever 315 is detected with detector 305 through light 323, which in one embodiment is reflected through free space from cantilever 315. In one embodiment, light 323 is reflected in a direction having a directional component from the free end to the fixed end of cantilever 315. In one embodiment, light 323 is reflected back to mirror 425, through lens 427 and off mirror 429 into detector 305.

As shown in FIG. 4, mirrors 411 and 425 are pulled back and away from being directly over cantilever 315 when compared to mirror 111 of FIG. 1. As a result, it is appreciated that mirrors 411 and 425 do not obstruct microscope objective lens 321 when observing cantilever 315 or regions of the sample surface 319 in close proximity to the cantilever 315. In addition, a plurality of signal lines 317 in close proximity can be probed using a plurality of scanning force microscopes 401.

Figure 5:
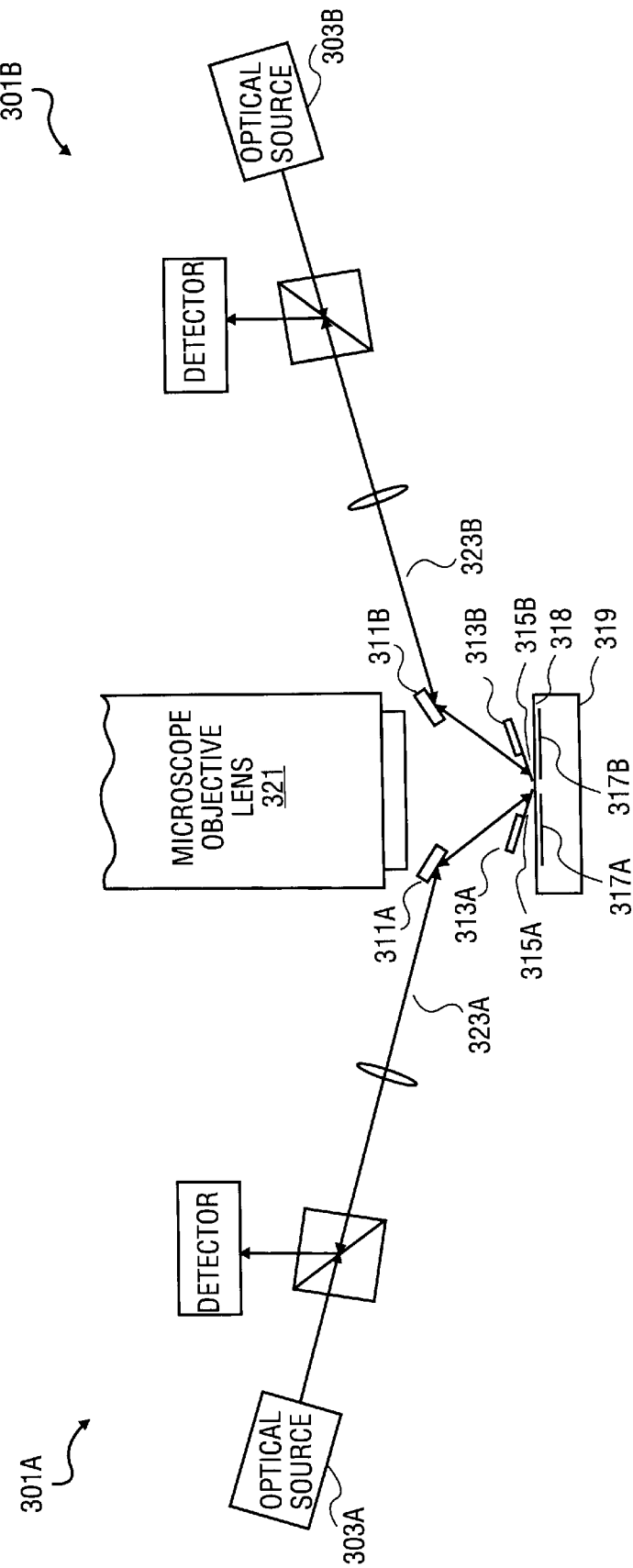
FIG. 5 is a block diagram of one embodiment of a plurality of scanning force microscopes having cantilevers that reflect light in accordance with teachings of the present invention.

For instance, FIG. 5 is a block diagram of yet another embodiment of a plurality of scanning force microscopes 301A to 301B being used to probe a plurality of signal lines 317A and 317B, which are in close proximity near the surface 318 of a sample 319. In one embodiment, both scanning force microscopes 301A and 301B of FIG. 5 are substantially similar to the scanning force microscope 301 of FIG. 3. As shown in the embodiment of FIG. 5, light 323A is directed from optical source 303A through free space to cantilever 315A of probe 313A. In one embodiment, light 323A is directed from optical source 303A in a direction having a directional component from the fixed end to the free end of cantilever 315A. In one embodiment, light 323A is reflected through free space from cantilever 315A. In one embodiment, light 323A is reflected from cantilever 315A in a direction having a directional component from the free end to the fixed end of cantilever 315A.

Similarly, light 323B in one embodiment is directed from optical source 303B through free space to cantilever 315B of probe 313B. In one embodiment, light 323B is directed from optical source 303B in a direction having a directional component from the fixed end to the free end of cantilever 315B. In one embodiment, light 323B is reflected through free space from cantilever 315B. In one embodiment, light 323B is reflected from cantilever 315B in a direction having a directional component from the free end to the fixed end of cantilever 315B.

As shown in FIG. 5, probe 313A including cantilever 315A of scanning force microscope 301A is positioned to probe signal line 317A. Probe 313B including cantilever 315B of scanning force microscope 301B is positioned to probe signal line 317B. As can be appreciated in FIG. 5, the tips of cantilevers 315A and 315B are positioned very close to one another over a surface 318 in order to probe signal lines 317A and 317B, respectively. Furthermore, with both mirrors 311A and 311B being pulled back away from being directly over cantilevers 315A and 315B, the field of vision of microscope objective lens 321 is not obstructed when observing probes 313A and 313B or the sample 319 in close proximity to the probes 313A and 313B.

Figure 6:
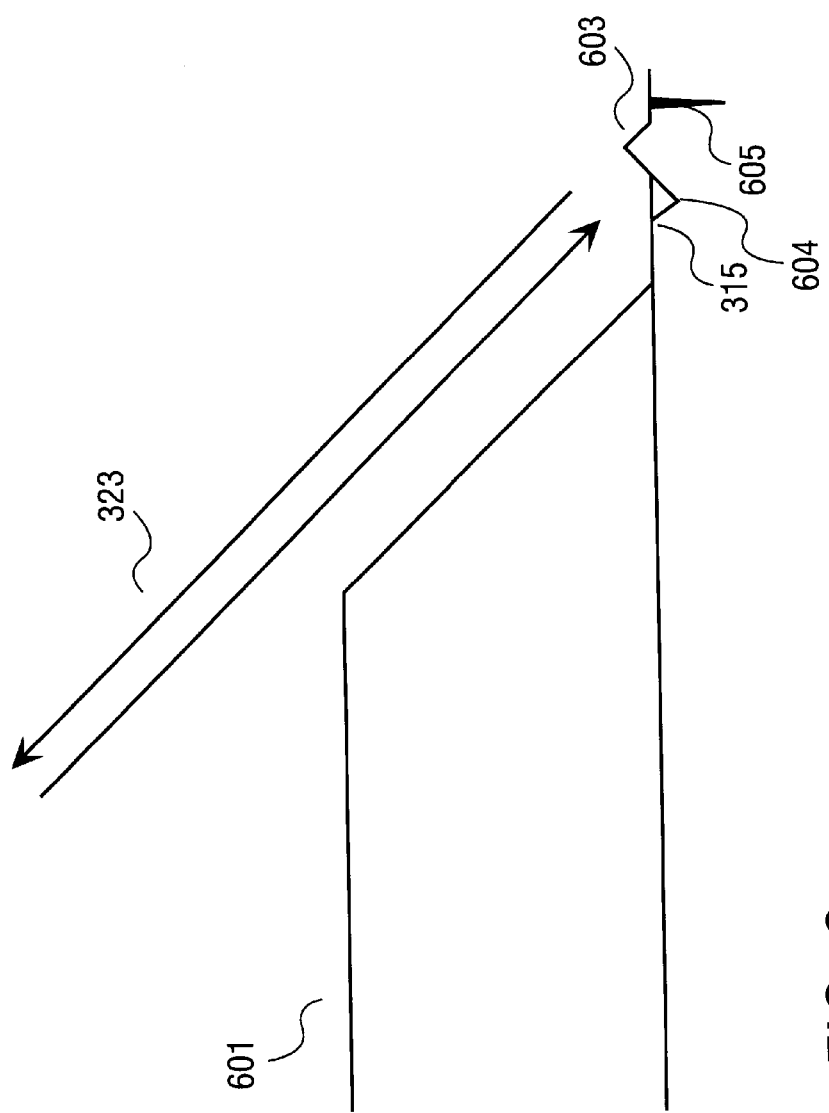
FIG. 6 is a block diagram illustrating one embodiment of a scanning force microscope probe having a cantilever with a reflective structure in accordance with the teachings of the present invention.

FIG. 6 is an illustration showing greater detail of one embodiment of a probe 313 in accordance with the teachings of the present invention. As shown in FIG. 6, probe 313 includes a cantilever 315 attached at a fixed end to a chip 601. In one embodiment, the other end of cantilever 315 is a free end. In one embodiment, cantilever 315 includes silicon. In one embodiment, cantilever 315 includes silicon nitride. In one embodiment, a reflective structure 603 is included on the back side of cantilever 315. As shown in FIG. 6, one embodiment of reflective structure 603 includes a skewed reflective surface relative to a surface of cantilever 315. In one embodiment, a tip 605 is included on the front side of cantilever 315. In another embodiment, tip 605 is not included on the front side of cantilever 315. In yet another embodiment, cantilever 315 is transparent to light 323 and a reflective structure 604 may therefore be disposed on the front side of cantilever 315.

As shown in FIG. 6, light 323 in one embodiment is directed through free space towards reflective structure 603. In one embodiment, light 323 is directed to reflective structure 603 in a direction having a directional component from the fixed end to the free end of cantilever 315. Stated differently, light 323 does not originate from directly overhead of reflective structure 603 in a direction perpendicular to cantilever 315. As a result, optics are not positioned directly over reflective structure 603 to direct light 323 in accordance with the teachings of one embodiment of the present invention. As shown in FIG. 6, one embodiment of chip 601 includes sides that are tapered back such that light 323 is directed to reflective structure 603 at an angle from behind chip 601 as shown in FIG. 6.

As shown in FIG. 6, light 323 in one embodiment is reflected through free space from a skewed reflective surface of reflective structure 603. In one embodiment, light 323 is reflected from cantilever 315 in a direction having a directional component from the free end to the fixed end of cantilever 315. In one embodiment, light 323 is reflected back in substantially the opposite direction from which light 323 originated. In another embodiment, light 323 is reflected back in a different direction, but still reflected from cantilever 315 in a direction having a directional component from the free end to the fixed end of cantilever 315. An example of this embodiment is illustrated in FIG. 4.

Figure 7:
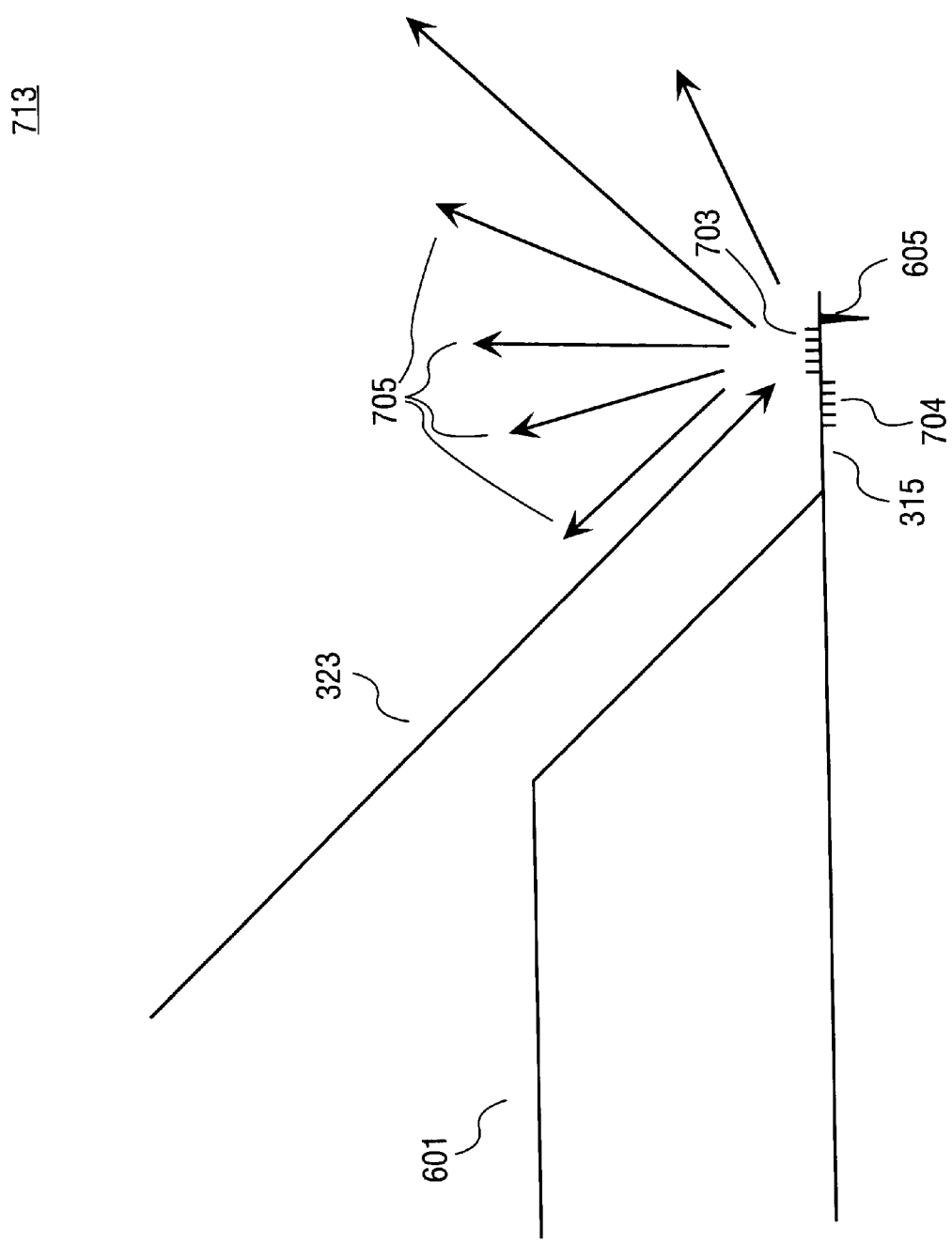
FIG. 7 is a block diagram illustrating another embodiment of the scanning force microscope probe having a cantilever with a diffraction grating in accordance with teachings of present invention.

FIG. 7 is an illustration of another embodiment of a probe 713 in accordance with the teachings of the present invention. Probe 713 of FIG. 7 includes a cantilever 315 attached at a fixed end to a chip 601. In one embodiment, the other end of cantilever 315 is a free end. In one embodiment, a reflective structure 703 is included on the back side of cantilever 315. In one embodiment, a tip 605 is included on the front side of cantilever 315. In another embodiment, tip 605 is not included on the front side of cantilever 315. In yet another embodiment, cantilever 315 is transparent to light 323 and a reflective structure 704 may therefore be disposed on the front side of cantilever 315.

In one embodiment, light 323 is directed through free space cantilever 315. In one embodiment, light 323 is directed to cantilever 315 in a direction having a directional component from the fixed end to the free end of cantilever 315. Similar to probe 313 of FIG. 6, light 323 does not originate from directly overhead of reflective structure 703 of FIG. 7 in a direction perpendicular to cantilever 315. As a result, optics are not positioned directly over reflective structure 703 to direct light 323 in accordance with the teachings of one embodiment of the present invention. As shown in FIG. 7, one embodiment of chip 601 includes sides that are tapered back such that light 323 is directed to reflective structure 703 at an angle from behind chip 601, as shown in FIG. 7.

As shown in FIG. 7, one embodiment of reflective structure 703 is a diffraction grating that is etched into the back side of cantilever 315 using well-known techniques. In another embodiment in which cantilever 315 is transparent to light 323, the diffraction grating may be etched into the front side of cantilever 315. In one embodiment, the light 323 that is reflected from reflective structure 703 includes a plurality of N orders of diffraction 705. As shown in FIG. 7, at least one of the N orders of diffraction 705 of reflected light 323 is reflected through free space from cantilever 315 having a directional component from the free end to the fixed end of cantilever 315. In one embodiment, one of the N orders of diffraction 705 that is reflected back having the directional component from the free end to the fixed end of cantilever 315 is directed into a detector 305 to detect motion of cantilever 315.

Figure 8:
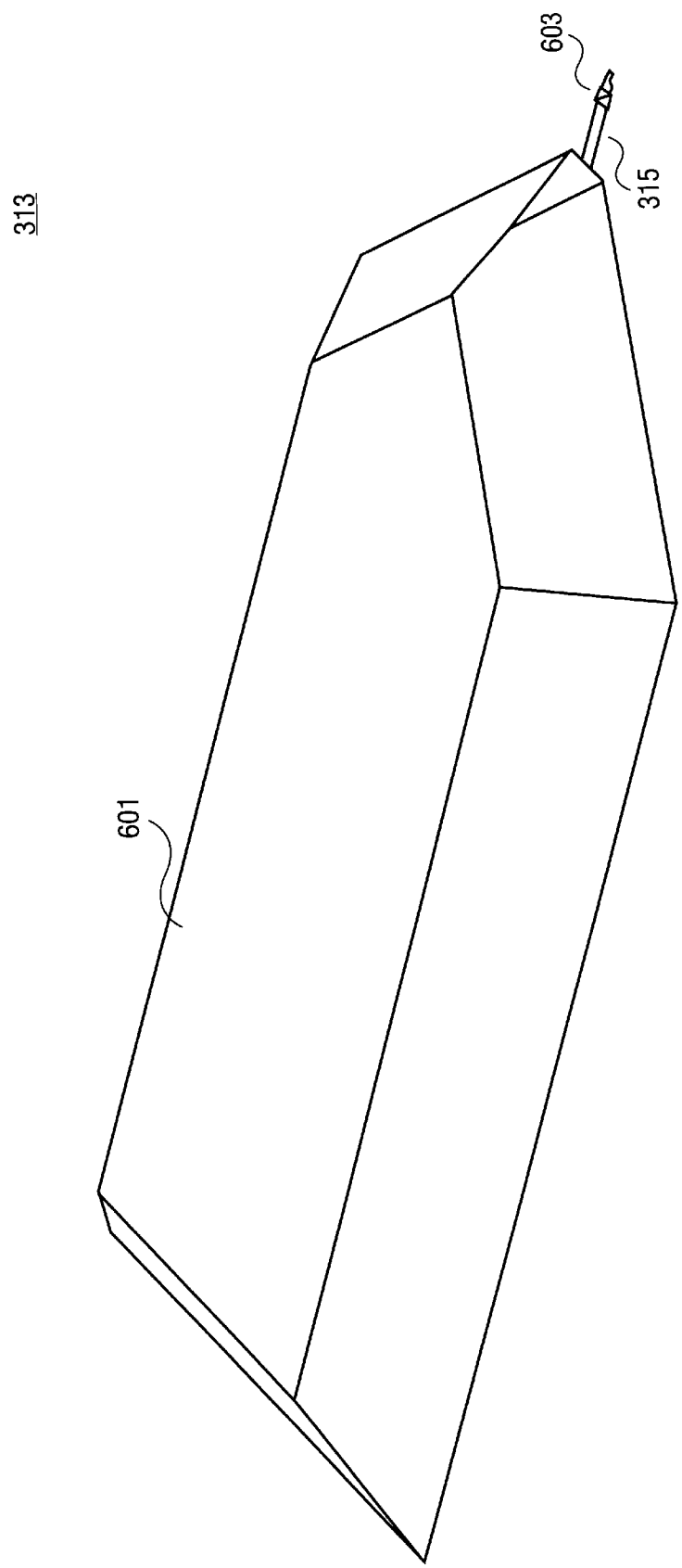
FIG. 8 is a perspective illustration of a scanning force microscope probe in accordance with the teachings of one embodiment of the present invention.

FIG. 8 is a perspective view illustration of a probe 313 including a cantilever 315 attached at a free end to a chip 601. As shown in FIG. 8, a reflective structure 603 is included on the back side of cantilever 315. In addition, FIG. 8 also shows that one embodiment of chip 601 includes sides that are tapered back, which allows light to be directed to reflective structure 603 at an angle originating from a direction towards the back side of cantilever 315 and from a direction towards the fixed end of cantilever 315. Furthermore, the tapered back sides of chip 601 allow a light to be reflected from reflective structure 603 in back in a direction towards the back side of cantilever 315 and towards the fixed end of cantilever 315. Hence, light is directed to and is reflected from reflective structure 603 without being obstructed by chip 601.

Therefore, a scanning force microscope probe cantilever having a reflective structure on the back side is realized. In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A scanning force microscope probe, comprising:
   a cantilever having a first end and a second end; and
   a reflective structure included on the cantilever such that at least a portion of light that is directed substantially through free space to the cantilever in a first direction having a directional component from the first end to the second end is reflected from the reflective structure substantially through free space in a second direction having a directional component from the second end to the first end.

2. The scanning force microscope probe of claim 1 wherein the first direction is substantially opposite to the second direction.

3. The scanning force microscope probe of claim 1 further comprising a tip disposed on a front side of the cantilever.

4. The scanning force microscope probe of claim 1 wherein the reflective structure comprises a reflective surface disposed on the back side of the cantilever.

5. The scanning force microscope probe of claim 1 wherein the reflective structure comprises a reflective surface disposed on a front side of the cantilever.

6. The scanning force microscope probe of claim 1 wherein the reflective structure comprises a diffraction grating disposed on the back side of the cantilever.

7. The scanning force microscope probe of claim 1 wherein the reflective structure comprises a diffraction grating disposed a front side of the cantilever.

8. The scanning force microscope probe of claim 1 wherein the cantilever comprises silicon.

9. The scanning force microscope probe of claim 1 wherein the cantilever comprises silicon nitride.

10. The scanning force microscope probe of claim 1 wherein the first end is a fixed end of the cantilever.

11. The scanning force microscope probe of claim 10 wherein the fixed end of the cantilever is fixed to a chip having tapered sides.

12. The scanning force microscope probe of claim 1 wherein the second end is a free end of the cantilever.

13. The scanning force microscope probe of claim 1 wherein a front side of the cantilever is configured to be disposed near and spaced apart from a surface of a sample such that the cantilever is capacitively coupled to a signal line proximate to the surface of the sample.

14. The scanning force microscope probe of claim 1 wherein a front side of the cantilever is configured to be in contact with a surface of a sample such that the cantilever is coupled to a signal line proximate to the surface of the sample.

15. A method of detecting motion of a scanning force microscope probe cantilever, the cantilever having a first end and a second end, the method comprising:

directing light to the cantilever in a first direction substantially through free space having a directional component from the first end to the second end of the cantilever;

reflecting at least a portion of the light from the cantilever in a second direction substantially through free space having a directional component from the second end to the first end of the cantilever; and receiving the portion of the light reflected from the cantilever to detect motion of the cantilever.

16. The method of claim 15 wherein the first direction is substantially opposite to the second direction.

17. The method of claim 15 further comprising capacitively coupling the cantilever to a signal line proximate to surface of a sample.

18. The method of claim 15 further comprising capacitively coupling a tip included on a front side of the cantilever to a signal line proximate to a surface of a sample.

19. The method of claim 15 further comprising contacting a front side of the cantilever with a surface of a sample such that the cantilever is coupled to a signal line proximate to the surface of the sample.

20. The method of claim 15 wherein reflecting at least the portion of the light from the cantilever in the second direction includes reflecting the light from a reflective structure disposed on the back side of the cantilever.

21. The method of claim 15 wherein reflecting at least the portion of the light from the cantilever in the second direction includes reflecting the light from a reflective structure disposed on the front side of the cantilever.

22. The method of claim 15 wherein reflecting at least the portion of the light from the cantilever in the second direction includes diffracting the light from a reflective structure disposed on the back side of the cantilever.

23. The method of claim 15 wherein the reflecting at least the portion of the light from the cantilever in the second direction includes diffracting the light from a reflective structure disposed on the front side of the cantilever.

* * * * *

(12) INTER PARTES REEXAMINATION CERTIFICATE (0089th)
United States Patent
Thomson et al.

(10) Number: US 6,298,715 C1
(45) Certificate Issued: Aug. 11, 2009

(54) SCANNING FORCE MICROSCOPE PROBE CANTILEVER WITH REFLECTIVE STRUCTURE

(75) Inventors: Douglas J. Thomson, Winnipeg (CA); Christopher O. Lada, Palo Alto, CA (US)

(73) Assignee: Suss Microtec Test Systems GmbH, Sacka (DE)

Reexamination Request:
No. 95/000,090, May 2, 2005

Reexamination Certificate for:
Patent No.: 6,298,715
Issued: Oct. 9, 2001
Appl. No.: 09/471,467
Filed: Dec. 22, 1999

(51) Int. Cl.
*G12B 21/00* (2006.01)
*G12B 21/22* (2006.01)
*G12B 21/02* (2006.01)

(52) U.S. Cl. .............. 73/105; 250/307; 850/6; 977/870

(58) Field of Classification Search .......... 73/105; 250/306, 307; 356/376
See application file for complete search history.

(56) References Cited

U.S. PATENT DOCUMENTS

| | | | | |
|---|---|---|---|---|
| 1,976,337 A | * | 10/1934 | Firestone et al. | 73/105 |
| 2,048,154 A | | 7/1936 | Abbott et al. | |
| 4,992,728 A | | 2/1991 | McCord et al. | |
| 5,260,567 A | * | 11/1993 | Kuroda et al. | 250/227.19 |
| 5,260,824 A | * | 11/1993 | Okada et al. | 359/368 |
| 5,336,369 A | * | 8/1994 | Kado et al. | 216/11 |
| 5,381,101 A | | 1/1995 | Bloom et al. | |
| 5,394,741 A | | 3/1995 | Kajimura et al. | |
| 5,408,094 A | * | 4/1995 | Kajimura | 250/234 |
| 5,656,769 A | | 8/1997 | Nakano et al. | |
| 5,753,912 A | * | 5/1998 | Matsuyama | 250/306 |
| 5,883,387 A | * | 3/1999 | Matsuyama et al. | 250/306 |
| 5,908,981 A | * | 6/1999 | Atalar et al. | 73/105 |
| 5,923,033 A | * | 7/1999 | Takayama et al. | 250/234 |
| 5,992,225 A | * | 11/1999 | Shirakawabe et al. | 73/105 |
| RE37,299 E | | 7/2001 | Amer et al. | |

FOREIGN PATENT DOCUMENTS

| | | |
|---|---|---|
| JP | H2-281103 | 11/1990 |
| JP | 05026662 A | 6/1993 |
| JP | 09222431 A | 8/1997 |
| JP | 10073607 A | 3/1998 |

OTHER PUBLICATIONS

N.F. van Hulst et al. "Operation of a scanning near field optical microscope in reflection in combination with a scanning force microscope", SPIE vol. 1639 Scanning Probe Microscopies (1992), pp. 36–43.*

G. Schmaltz, Uber Glatte und Ebenheit als physikalisches und physiologisches Problem, Zeitschrift des Vereines deutscher Ingenieure, Oct. 12, 1929, pp. 1461–1467, Bd 73, Nr. 41, Germany.

G. Binnig, and C. F. Quate, "Atomic Force Microscope", Phys. Rev. Lett. vol. 56, No. 9, Mar. 1986, p. 930–933.

Thomas R. Albrecht and Calvin F. Quate, "Atomic resolution with the atomic force microscope on conductors and nonconductors", J. Vac. Sci. Technol. A 6 (2), Mar./Apr. 1988, pp. 271–274.

* cited by examiner

*Primary Examiner*—Joseph R. Pokrzywa

(57) ABSTRACT

A scanning force microscope probe cantilever having a reflective structure. In one embodiment, the described scanning force microscope probe cantilever includes a reflective structure on the cantilever. In one embodiment, light is directed to the reflective structure on the cantilever in a direction having a directional component from a fixed end to a free end of the cantilever. In one embodiment, light is reflected from the reflective structure in a direction having a directional component from the free end to a fixed end of the cantilever.

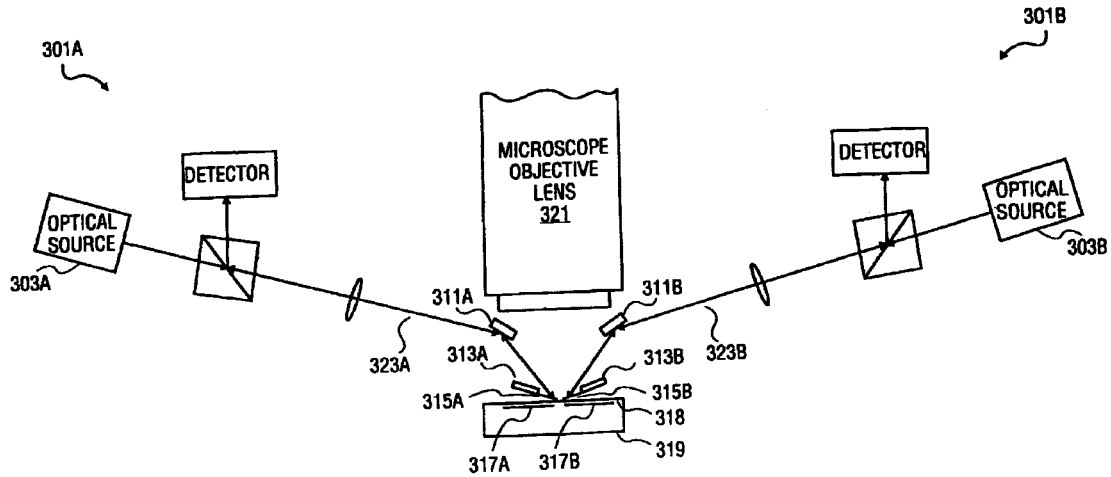

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–23 are cancelled.

New claim 24 is added and determined to be patentable.

*24. A scanning force microscope apparatus, comprising:*
*a plurality of probes configured to be positioned in a plurality of positions in close proximity, wherein each of the plurality of probes comprises:*
*a cantilever having a fixed end and a free end;*
*a tip disposed on a front side of the cantilever; and*
*a reflective structure included on a back side of the cantilever such that at least a portion of light that is directed substantially through free space to the cantilever in a first direction having a first directional component from the fixed end to the free end and at least a second directional component from above a back side of the cantilever to the cantilever is reflected from the reflective structure substantially through free space in a second direction having at least a third directional component from the free end to the fixed end; and*
*at least one optical arrangement configured to direct the portion of light to and from the cantilever, wherein the at least one optical arrangement is not located directly above the free end.*

\* \* \* \* \*